United States Patent
Tanaka et al.

(10) Patent No.: US 7,290,437 B1
(45) Date of Patent: Nov. 6, 2007

(54) SENSOR NODE FOR IMPACT DETECTION

(75) Inventors: Hidetoshi Tanaka, Kokubunji (JP); Kei Suzuki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 11/211,485

(22) Filed: Aug. 26, 2005

(30) Foreign Application Priority Data

Mar. 24, 2005 (JP) .............................. 2005-085441

(51) Int. Cl.
*G01M 7/00* (2006.01)
(52) U.S. Cl. ..................................... 73/12.01
(58) Field of Classification Search ............... 73/12.01, 73/514.34, 35.11; 310/329, 332; 324/727, 324/109; 360/60, 75; 340/429
See application file for complete search history.

(56) References Cited

U.S. PATENT DOCUMENTS

| | | | | |
|---|---|---|---|---|
| 5,612,670 | A * | 3/1997 | Snyder et al. | 340/429 |
| 6,227,051 | B1 * | 5/2001 | Otsuchi et al. | 73/514.34 |
| 6,236,527 | B1 * | 5/2001 | Uchiike et al. | 360/75 |
| 6,510,014 | B2 * | 1/2003 | Kikuta et al. | 360/60 |

2005/0052097 A1   3/2005 Tanaka et al.

FOREIGN PATENT DOCUMENTS

| | | |
|---|---|---|
| JP | 08-145783 | 11/1994 |
| JP | 09-264778 | 3/1996 |
| JP | 10-260202 | 3/1997 |

* cited by examiner

*Primary Examiner*—Jewel Thompson
(74) *Attorney, Agent, or Firm*—Reed Smith LLP; Stanley P. Fisher, Esq.; Juan Carlos A. Marquez, Esq.

(57) ABSTRACT

The invention is intended to provide a technique regarding sensor nodes for impact detection to enable the intensities of impacts to be determined in a multi-value or analog mode and to reduce the power consumption of sensor nodes. The sensor node is provided with a shock detection sensor comprising a piezoelectric element unit which generates an electric charge corresponding to an external impact, a capacitor which rectifies and accumulates the electric charge so generated, and a voltage detector which operates on the accumulated power and externally outputs a signal when the accumulated voltage reaches a preset level; a stand-by control object section which is caused by the external signal to return from a stand-by state and to operate; and a power supply which feeds power to the stand-by control object section, wherein the operation of the stand-by control object section is triggered by the signal of impact detected by the piezoelectric element unit.

12 Claims, 10 Drawing Sheets

SENSOR NODE FOR IMPACT DETECTION

CLAIM OF PRIORITY

The present invention claims priority from Japanese application JP 2005-085441 filed on Mar. 24, 2005, the content of which is hereby incorporated by reference into this application.

BACKGROUND OF THE INVENTION

The present invention relates to a sensor node technique and more particularly to a sensor node for detecting impacts.

A sensor node senses information unevenly distributed in its environment at designated intervals of time, and transmits the sensed information values by wireless communication. On account of its intrinsic function to sense and transmit by wireless communication information unevenly distributed in its environment, a sensor node has to be able to operate on a battery for a long period.

Conventional devices for detecting impacts arising at irregular intervals of time for use in sensor nodes detect such impacts with a mechanical switch or a switch using electric power generated by electromagnetic inductance or a piezoelectric element, or through the measurement of variations in acceleration with an acceleration sensor which is kept operating all the time.

A conventional impact detecting sensor using a piezoelectric element utilizes the trend of the vibration, which accompanies the operation of the device, to increase when an abnormality arises, and detects a signal which is generated when the vibration has surpassed a certain amplitude (see, for instance, Japanese Patent Application Laid-Open Nos. 8-145783 and 9-264778).

In another conventional sensor, when the acceleration working on the piezoelectric element is at or above a certain level, a voltage is applied to the gate of a MOS-FET to turn it on and detect a signal, and the duration of its being kept on can be adjusted with a resistor (see, for instance, Japanese Patent Application Laid-Open No. 10-260202).

SUMMARY OF THE INVENTION

Any such sensor node using a conventional impact detection involves a problem that, where a switch of the aforementioned type is used, only a two-value determination can be made, namely whether or not the sensed intensity of the impact has surpassed a threshold, but no multi-value or analog determination can be made.

Or where the aforementioned acceleration sensor is used, though analog determination is possible, measuring the acceleration by keeping the sensor in operation all the time involves another problem of greater power consumption, which makes it impossible to use the sensor node for a long continuous period.

An object of the present invention, therefore, is to provide a technique regarding sensor nodes for impact detection to enable the intensities of impacts to be determined in a multi-value or analog mode and to reduce the power consumption of sensor nodes.

In order to achieve the object stated above, according to the invention, an electric charge is generated by having a piezoelectric element distorted by an external impact, and a sensor node in a waiting state is returned to an active state, trigged by this charge. By measuring. the wattage corresponding to the generated charge with the sensor node, it is made possible to evaluate the intensity of the impact in a multi-valued or analog mode.

Since this enables power consumption by the sensor node in its waiting mode to be dramatically reduced, it is made possible to realize a sensor node for impact detection consuming very little power.

Typical examples of configuration of the sensor node for impact detection according to the invention will be summarized below.

(1) A configuration is characterized by being provided with a shock detection sensor comprising a piezoelectric element unit which generates an electric charge corresponding to an external impact, a capacitor which rectifies and accumulates the electric charge so generated,. and a voltage detector which operates on the accumulated power and externally outputs a signal when the accumulated voltage reaches a preset level; a stand-by control object section which is caused by the external signal to return from a stand-by state and to operate; and a power supply which feeds power to the stand-by control object section, wherein the operation of the stand-by control object section is triggered by the signal of impact detected by the piezoelectric element unit.

(2) A configuration is characterized by being provided with a shock detection sensor comprising a piezoelectric element unit which generates an electric charge corresponding to an external impact, a capacitor which rectifies and accumulates the electric charge so generated, and a voltage comparator which compares the accumulated voltage of the capacitor with a reference voltage and externally outputs a signal when the accumulated voltage has surpassed the reference voltage; a stand-by control object section which is caused by the external signal to return from a stand-by state and to operate; and a power supply which feeds power to the voltage comparator and the stand-by control object section, wherein the operation of the stand-by control object section is triggered by the signal of impact detected by the piezoelectric element unit.

(3) A configuration is characterized by being provided with a shock detection sensor comprising a piezoelectric element unit which generates an electric charge corresponding to an external impact, and a voltage comparator which compares the voltage so generated with a preset reference voltage and externally outputs a signal when the generated voltage has surpassed the reference voltage; a stand-by control object section which is caused by the external signal to return from a stand-by state and to operate; and a power supply which feeds power to the voltage comparator and the stand-by control object section, wherein the operation of the stand-by control object section is triggered by the signal of impact detected by the piezoelectric element unit.

(4) In a sensor node for impact detection of any of the configurations stated in (1) through (3), the shock detection sensor and the stand-by control object section are in a stand-by state until any impact is detected by the piezoelectric element unit.

(5) In a sensor node for impact detection of any of the configurations stated in (1) through (3), the stand-by control object section measures the intensity of an impact by measuring the time length of a signal outputted by the shock detection sensor.

(6) In a sensor node for impact detection of any of the configurations stated in (1) through (3), the piezoelectric element unit is provided with a planar piezoelectric element member, a plate which fixes one end of the piezoelectric element member and a mass installed at an end of a free end, which is the other end of the piezoelectric element member, and an impulse working on the plate deforms the piezoelectric element member to generate an electric charge.

(7) In a sensor node for impact detection of any of the configurations stated in (1) through (3), the stand-by control object section has means which, triggered by the signal of impact detected by the piezoelectric element unit, senses ambient information unevenly distributed in the environment, and processes the sensed information to perform wireless communication.

According to the invention, detection of the intensities of impacts in a multi-value or analog mode is realized, and further a technique to realize a sensor node for impact detection that can significantly reduce power consumption is achieved.

DETAILED DESCRIPTION OF THE PREFERRED EMBODIMENTS

Preferred embodiments of the present invention will be described in detail below with reference to the accompanying drawings.

Embodiment 1

Figure 1:
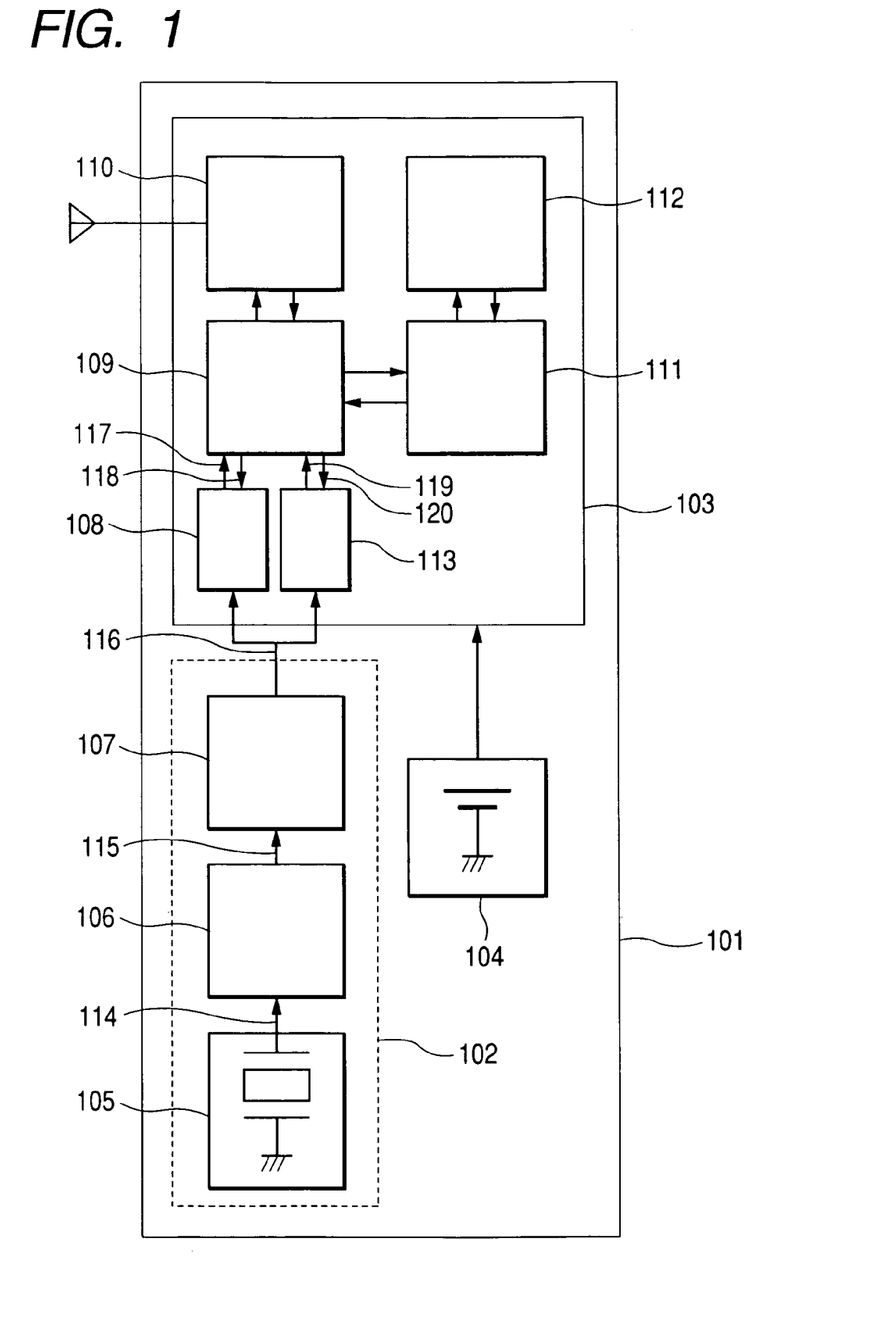
FIG. 1 is a block diagram illustrating the configuration of a sensor node for impact detection, which is a preferred embodiment of the present invention.

FIG. 1 is a block diagram illustrating the configuration of a sensor node for impact detection, which is a preferred embodiment of the invention.

A sensor node 101 comprises a shock detection sensor 102 configured of a piezoelectric element unit 105, a capacitor 106 and a voltage detector 107; a stand-by control object section 103 configured of a wake up signal generator 108, an impact detect circuit 113, a microcomputer 109, a radio frequency transceiver circuit 110, an A/D converter 111, a sensor 112 and other elements; and a power supply 104.

Referring to FIG. 1, the shock detection sensor 102 requires no power supply, while the stand-by control object section 103 is supplied with power by the power supply 104. Until any impact is detected, power supply is either off or in a waiting state for the radio frequency transceiver circuit 110, the A/D converter 111 and the sensor 112, in a waiting state for the microcomputer 109, and in a state of awaiting a signal from the shock detection sensor 102 for the wake up signal generator 108 and the impact detect circuit 113. These states constitute a stand-by state for the sensor node. As the microcomputer 109 consumes only about a few µW of power when in its waiting state while the wake up signal generator 108 and the impact detect circuit 113 also consume only a few µW or less even when operating, the sensor node can realize low power consumption in its stand-by state.

Next will be described how an impact is detected.

When an impact works on the sensor node 101, the piezoelectric element in the piezoelectric element unit 105 is distorted to generate an electric charge. The charge generated by the piezoelectric element unit 105 is rectified and accumulated by the capacitor 106 to provide a charge corresponding to the external impact and, when accumulated to a certain voltage, is transmitted by the voltage detector 107 to the stand-by control object section 103 as the impact detection signal sensed by the shock detection sensor 102. The signal transmitted by the shock detection sensor 102 is inputted into the wake up signal generator 108 and the impact detect circuit 113, and the wake up signal from the wake up signal generator 108 causes a signal to be transmitted to the microcomputer 109, which is thereby awakened from a stand-by state to an active state. The microcomputer 109 in the active state captures the signal from the impact detect circuit 113, measures the intensity of the impact, and performs predetermined control. For the predetermined control, ambient information is sensed by the A/D converter 111 and the sensor 112, the sensed information is processed by the microcomputer 109, and communication is performed by the radio frequency transceiver circuit 110. Upon completion of the predetermined processing, the sensor node 101 returns to the stand-by state.

Embodiment 2

Figure 2:
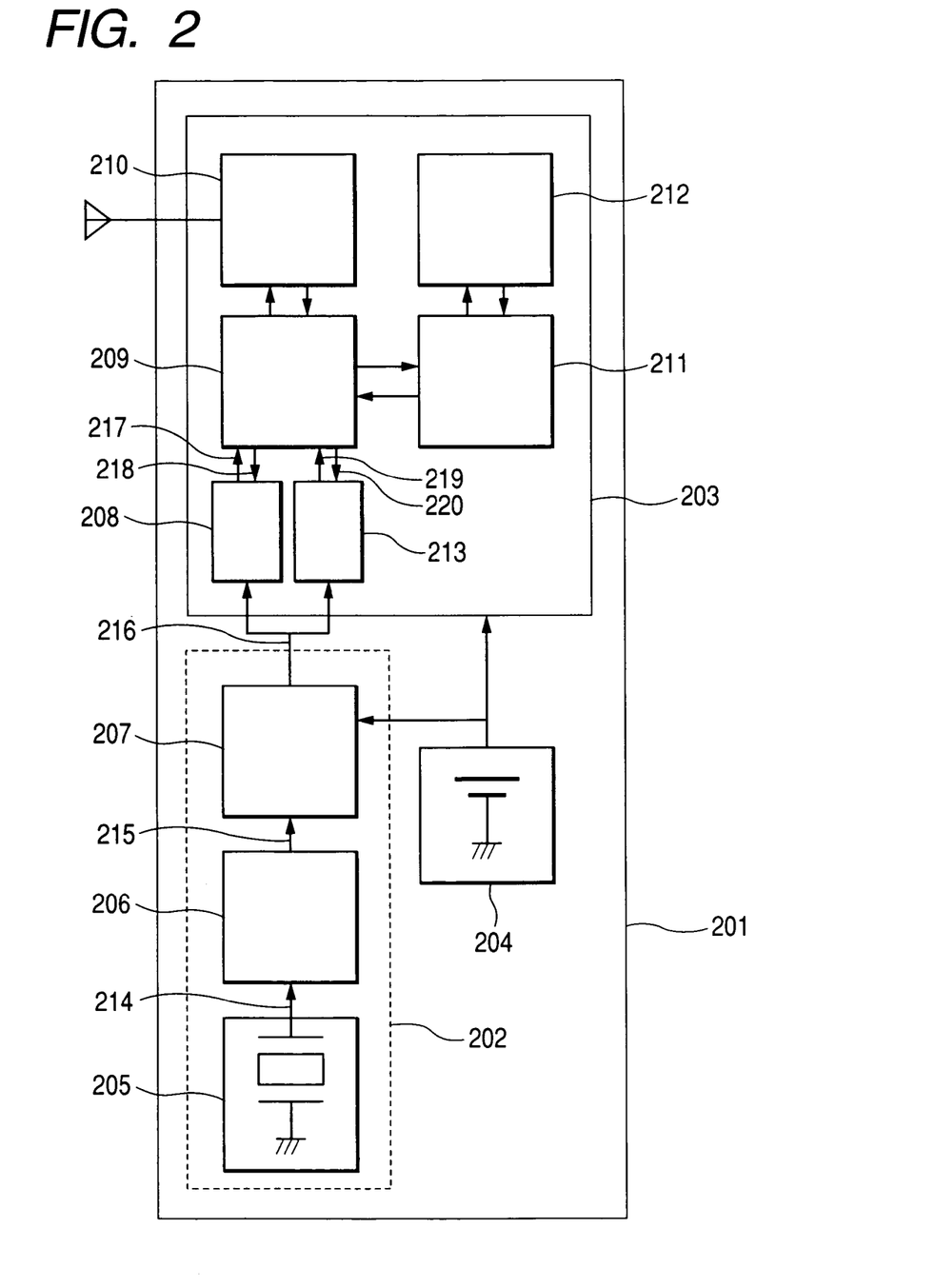
FIG. 2 is a block diagram illustrating the configuration of a sensor node for impact detection, which is another preferred embodiment of the invention.

FIG. 2 is a block diagram illustrating the configuration of a sensor node for impact detection, which is another preferred embodiment of the invention.

A sensor node 201 comprises a shock detection sensor 202 configured of a piezoelectric element unit 205, a capacitor 206 and a voltage comparator 207; a stand-by control object section 203 configured of a wake up signal generator 208, an impact detect circuit 213, a microcomputer 209, a radio frequency transceiver circuit 210, an A/D converter 211, a sensor 212 and other elements; and a power supply 204. As will be described afterwards, the capacitor 206 in the shock detection sensor 202 may not be required depending on the method of shock detection.

In this embodiment, power is fed by the power supply 204 to the voltage comparator 207 and the stand-by control object section 203 in the shock detection sensor 202. The piezoelectric element unit 205 and the capacitor 206 in the shock detection sensor 202 require no power supply. Until any impact is detected, power supply is either off or in a waiting state for the radio frequency transceiver circuit 210, the A/D converter 211 and the sensor 212, in a waiting state for the microcomputer 209, and in a state of awaiting a signal from the shock detection sensor 202 for the wake up signal generator 208, the impact detect circuit 213 and the voltage comparator 207. These states constitute a stand-by state for the sensor node. As the microcomputer 209 consumes only about a few μW of power when in its waiting state while the wake up signal generator 208, the impact detect circuit 113 and the voltage comparator 207 also consume only a few μW or less even when operating, the sensor node can realize low power consumption in its stand-by state.

Next will be described how an impact is detected. When an impact works on the sensor node 201, thepiezoelectric element in the piezoelectric element unit 205 is distorted to generate an electric charge. The charge generated by the piezoelectric element unit 205 is rectified and accumulated by the capacitor 206 to provide a charge corresponding to the external impact and, when accumulated to a certain voltage, is transmitted by the voltage comparator 207 to the stand-by control object section 203 as the impact detection signal sensed by the shock detection sensor 202.

Where the capacitor 206 is not used as referred to above, as the piezoelectric element unit 205 generates an AC voltage corresponding to the quantity of the generated charge, the AC voltage of the piezoelectric element unit 205 is inputted directly into the voltage comparator 207; when the voltage from the piezoelectric element unit 205 reaches a certain level, it is transmitted to the stand-by control object section 203 by the voltage comparator 207 as the impact detection signal sensed by the shock detection sensor 202. The signal transmitted by the shock detection sensor 202 is inputted into the wake up signal generator 208 and the impact detect circuit 213, and the wake up signal from the wake up signal generator 208 causes a signal to be transmitted to the microcomputer 209, which is thereby awakened from a stand-by state to an active state. The microcomputer 209 in the active state captures the signal from the shock detection sensor 202, measures the intensity of the impact, and performs predetermined control. For the predetermined control, ambient information is sensed by the A/D converter 211 and the sensor 212, the sensed information is processed by the microcomputer 209, and communication is performed by the radio frequency transceiver circuit 210. Upon completion of the predetermined processing, the sensor node 201 returns to the stand-by state.

Figure 3A:
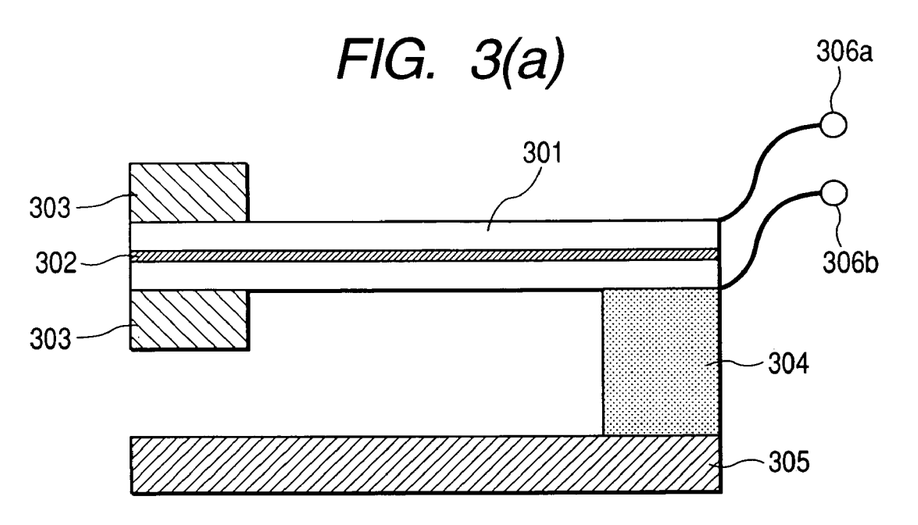
FIGS. 3(a) and 3(b) are profiles illustrating examples of piezoelectric element unit for use in the invention.
Figure 3B:
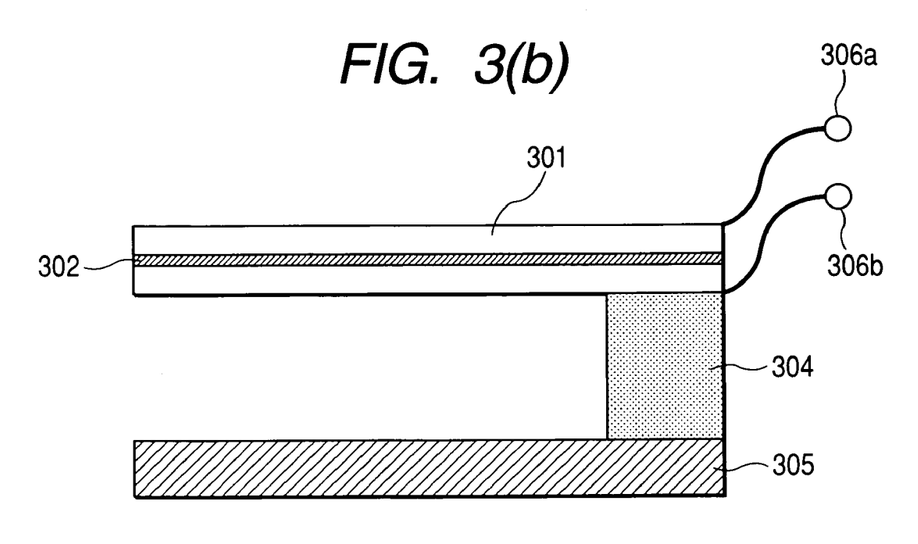

FIGS. 3(a) and 3(b) are profiles illustrating examples of piezoelectric element unit for use in the invention. The piezoelectric element unit shown in FIG. 3(a) is configured of a piezoelectric element 301, a metal plate 302, a mass 303, a fixed plate 304, a fixed face 305 and electrodes 306a and 306b.

FIG. 3(b) shows a piezoelectric element unit shown in FIG. 3A with the mass 303 omitted. The piezoelectric element 301 is to be made of a material having a piezoelectric effect such as lead zirconate titanate ceramic, lead titanate ceramic or lead metaniobate ceramic. The metal plate 302 is to have a bimorph shape, sandwiched between the layers of the piezoelectric element 301. The metal plate 302 is intended to increase the durability of the piezoelectric element 301 or increasing the distortion of the piezoelectric element 301 by external forces, but it can be dispensed with. The mass 303 should have the optimum size that is determined by the materials and sizes of the piezoelectric element 301 and the metal plate 302 and the intensity of the external impact to be measured. Depending on the intensity of the external impact, a shape which does not require the mass 303, as shown in FIG. 3(b) can be selected. When an impact works from outside, an electric charge corresponding to that external impact is generated between the electrodes 306a and 306b. As will be described afterwards, this charge is used for measuring the intensity of the impact and the sensor node is returned from its stand-by state.

Figure 4:
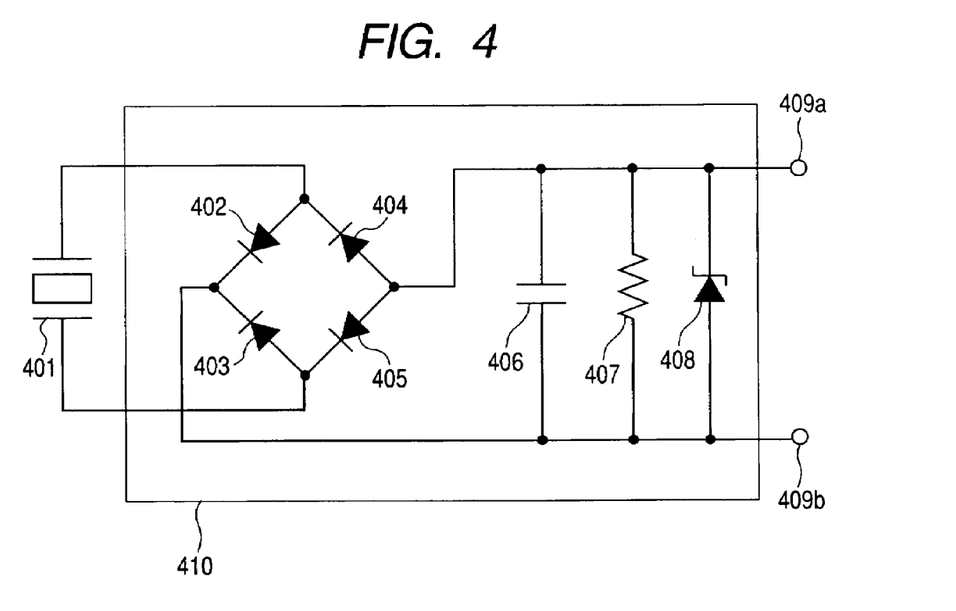
FIG. 4 shows one example of capacitor for use in the configurations shown in FIG. 1 and FIG. 2.

FIG. 4 shows one example of capacitor for use in the configurations shown in FIG. 1 and FIG. 2. A capacitor 410 is configured of rectification diodes 402 through 405, a charging capacitor 406, a discharging resistance 407, a Zener diode 408 for protection from breakdown voltage and output terminals 409a and 409b. The piezoelectric element unit 401, such as the one described with reference to FIGS. 3A and 3B, is connected to rectification diodes. As described with reference to FIG. 1 and FIG. 2, the piezoelectric element unit 401 performs rectification with the diodes 402 through 405 to generate electric charges corresponding to the external impact, and accumulates the charges in the charging capacitor 406. The resistance 407, as will be described afterwards, is a resistance for adjusting the duration of discharge, and the Zener diode 408 for protection from breakdown voltage is intended to prevent surpassing of the breakdown voltage of the charging capacitor 406 and the breakdown voltage of an additional circuit connected between the output terminals 409a and 409b.

Figure 5:
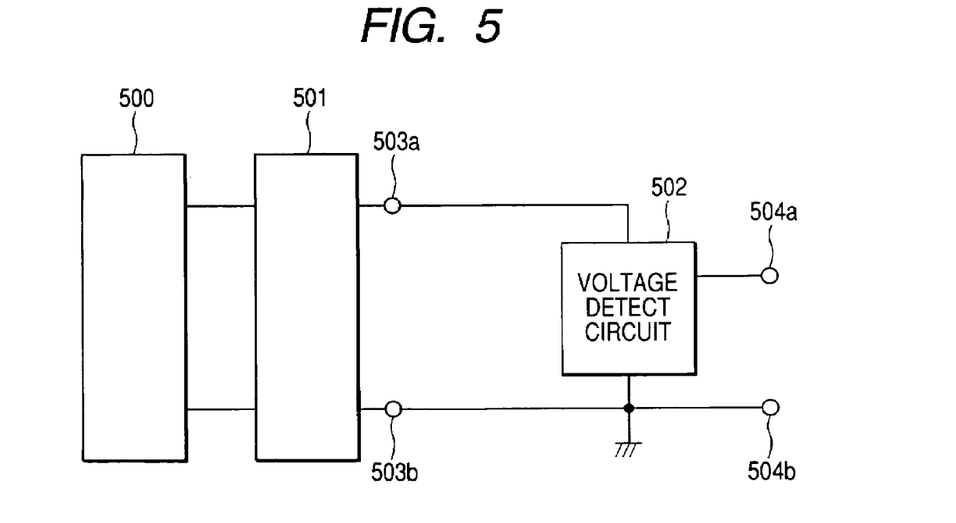
FIG. 5 shows one example of shock detection sensor for use in the configuration shown in FIG. 1.

FIG. 5 shows one example of shock detection sensor for use in the configuration shown in FIG. 1. This shock detection sensor is configured of a piezoelectric element unit 500, a capacitor 501, a voltage detector 502, terminals 503a and 503b for connecting the capacitor 501 and the voltage detector 502, and terminals 504a and 504b for transmitting signals to the stand-by control object section shown in FIG. 1. The voltage detector 502 outputs from the terminals 504a and 504b a voltage (equal to either the input voltage or to the detect voltage) when the voltage of the capacitor 501 has surpassed the detect voltage.

Since the current required for operating the voltage detector 502 is only about a few μW, the size of piezoelectric element unit of the type described with reference to FIG. 4 (denoted by 401 in FIG. 4) and its capacitor (denoted by 406 in FIG. 4) are designed to optimally match the operating power of the voltage detector 502. The shock detection sensor in this embodiment, as is evident from the foregoing description, consumes no power when standing by. Nor does it require any power supply when in operation because it relies on power generated by the piezoelectric element unit.

Figure 6:
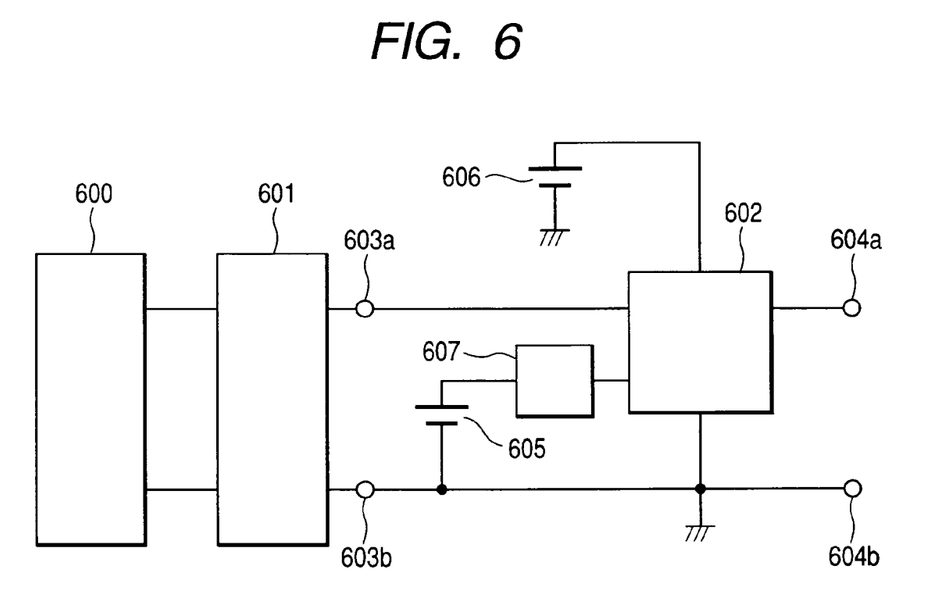
FIG. 6 shows one example of shock detection sensor for use in the configuration shown in FIG. 2.

FIG. 6 shows one example of shock detection sensor for use in the configuration shown in FIG. 2. It is configured of a piezoelectric element unit 600, a capacitor 601, a voltage comparator 602, terminals 603a and 603b for connecting the output terminals of the piezoelectric element unit shown in FIG. 3 (306a and 306b) or the output terminals of the capacitor 410 (409a and 409b) to the voltage comparator 602, terminals 604a and 604b for transmitting signals to the stand-by control object section shown in FIG. 1, a reference voltage generator 607, a power supply 605 and another power supply 606 (corresponding to the power supply 204 shown in FIG. 2). The voltage comparator 602 outputs from the terminals 604a and 604b a certain voltage when the voltage of the reference voltage generator 607 has surpassed the reference voltage.

Further, as described with reference to the embodiment shown in FIG. 2, as the piezoelectric element unit 600 generates an AC voltage when no capacitor is used, the AC voltage from the piezoelectric element unit 600 is directly inputted into the voltage comparator 602, and when the voltage of the piezoelectric element unit 600 reaches the reference voltage, the voltage comparator 602 outputs a certain voltage from the terminals 604a and 604b.

Since power is externally fed to the voltage comparator 602, it is sufficient for a voltage for impact detection to be supplied from the capacitor 601 or, where no capacitor is used, from the piezoelectric element unit 600. For this reason, the size of piezoelectric element of the piezoelectric element unit and the capacitor shown in FIG. 4 (denoted by 406 in FIG. 4) can be smaller than in the case shown in FIG. 5.

Figure 7:
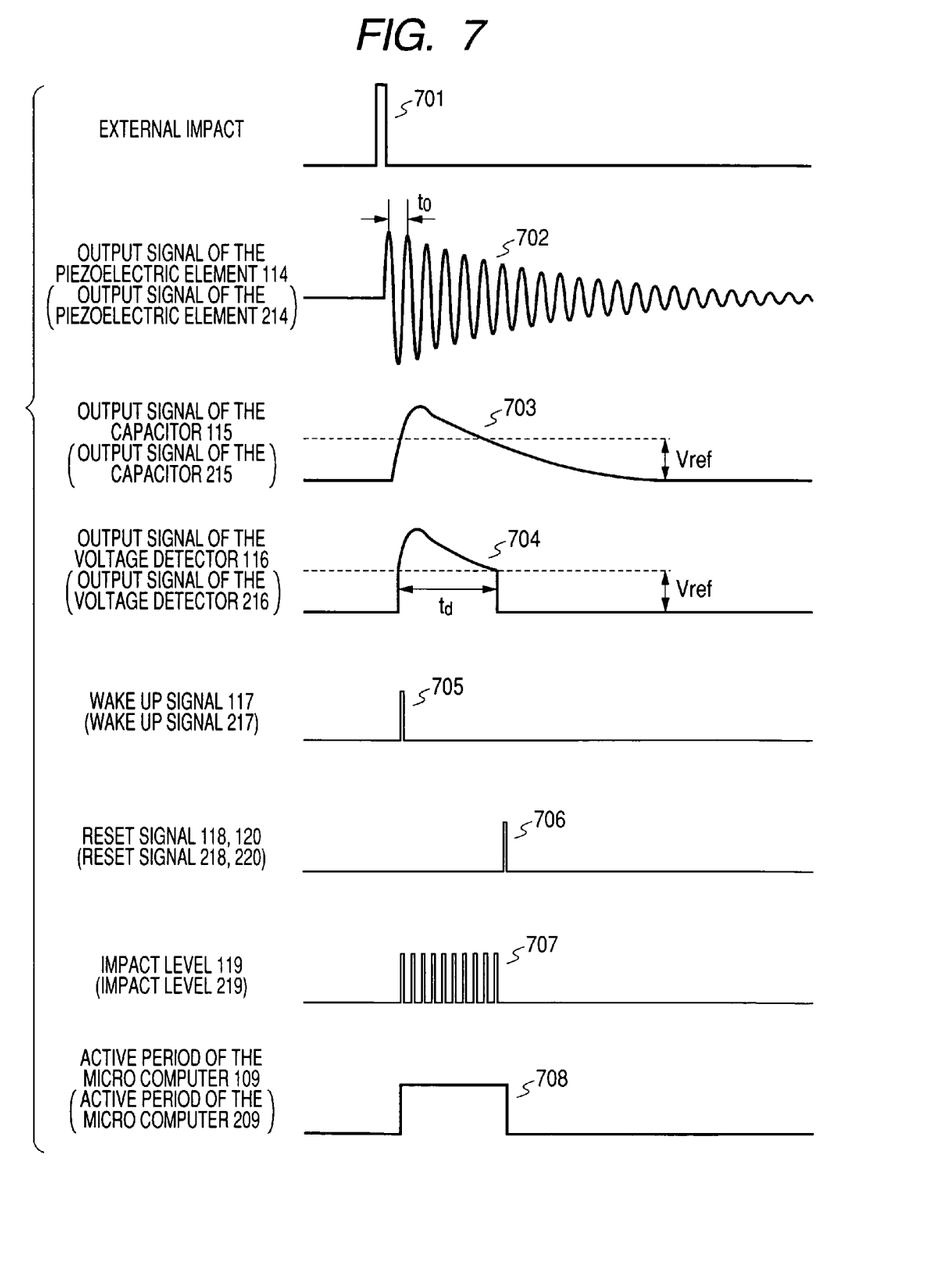
FIG. 7 is a time chart also showing waveforms which occur when an impact is applied to the sensor node of FIG. 1 or FIG. 2, wherein a capacitor is used.

FIG. 7 is a time chart also showing waveforms which occur where the capacitor 206 is used in the sensor node of FIG. 1 or FIG. 2 and an impact is applied to the sensor node. In the following description and drawings, parenthesized numerals or phrases refer to a case in which the capacitor 206 is used in the sensor node of FIG. 2.

When an impulse-form impact 701 is applied to the sensor node 101 (201) of FIG. 1, the output signal of the piezoelectric element 114 (214) supplied from the piezoelectric element unit 105 (205) manifests a repetitive attenuating waveform denoted by 702. Here, $t_o$ is uniquely determined by the size of the piezoelectric element unit in FIGS. 3A and 3B and FIG. 9 to be referred to below. The waveform of 702 is converted by the capacitor 106 (206) into a waveform denoted by 703 as the output signal of the capacitor 115 (215). The waveform denoted by 703 is converted by the voltage detector 107 (the voltage comparator 207) into the output signal of the voltage detector 116 (the output signal of the voltage comparator 216) having the waveform denoted by 704. Here the waveform of 704 is generated from the waveform of 703 by using a detection voltage (comparison voltage) $V_{ref}$. The $t_d$ of 704 can be determined by appropriately selecting the size of the piezoelectric element unit 105 (205), the resistance of the capacitor 106 (206) and the charge capacity according to the intensity of the impact to be detected. By measuring the length of this $t_d$, the intensity of vibration can be detected in an analog value.

When the output signal of the voltage detector 116 (216) has surpassed $V_{ref}$, which is the detection voltage (comparison voltage), the wake up signal 117 (217) is transmitted by the wake up signal generator to the microcomputer 109 (209) according to the part of the time chart denoted by 705. This wake up signal brings the microcomputer 109 (209) into an awaken state. Also, as described earlier, the output signal of the voltage detector 116 (216) and the impact detect circuit 113 (213) give an impact level signal 119 (219) of the form denoted by 707 in the time chart. As an example of this impact detect circuit 113 (213), a counter circuit can be used. In this case, as long as the voltage detect signal is on, the clocks of the stand-by control object section 103 (203) are inputted into the counter, which counts the pulses generated during the period of time $t_d$ to detect the intensity of the impact.

The microcomputer 109 (209) captures the intensity of the impact from the impact detect circuit 113 (213); after completing other predetermined steps of processing, it transmits reset signals 118 and 120 (218 and 220) in accordance with the 706 part of the time chart and, after resetting the wake up signal generator 108 (208) and the impact detect circuit 113 (213), enters into a stand-by state. A time chart regarding the operating state of the microcomputer 109 (209) is shown as denoted by 708.

The method for analog detection of the impact intensity charted in FIG. 7 is one example, and any other appropriate method can be used as well.

Figure 8:
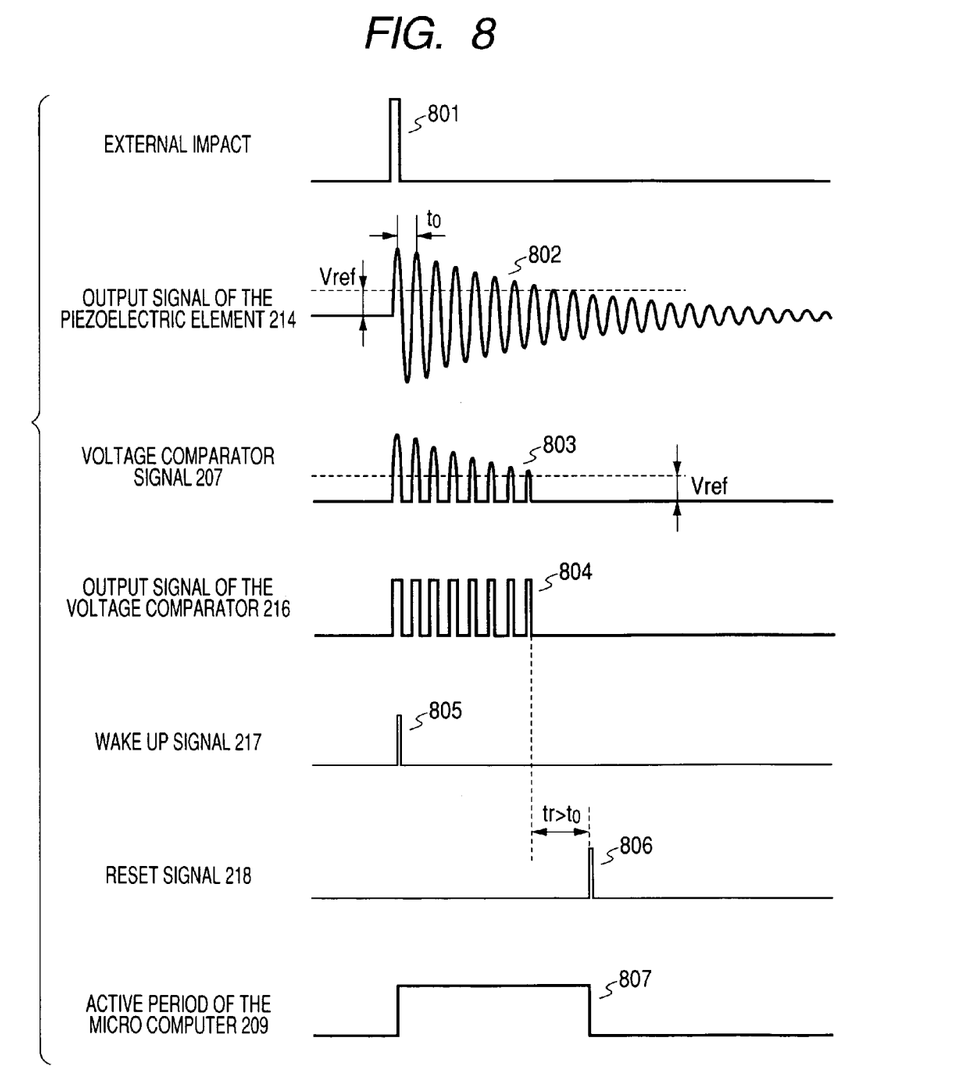
FIG. 8 is a time chart also showing waveforms which occur when an impact is applied to the sensor node of FIG. 2, wherein neither a capacitor nor an impact detect circuit is used.

FIG. 8 is a time chart also showing waveforms which occur when an impact is applied to the sensor node of FIG. 2, wherein neither the capacitor 206 nor the impact detect circuit 213 is used.

When an impulse-form impact 801 denoted by 801 is applied to the sensor node of FIG. 2, the output signal of the piezoelectric element 214 supplied from the piezoelectric element unit 205 of FIG. 2 manifests a repetitive attenuating waveform denoted by 802. Here, $t_o$ is uniquely determined by the size of the piezoelectric element unit in FIGS. 3A and 3B and FIG. 9 to be referred to below. The waveform of 802 takes on a waveform denoted by 803, and the output signal of the voltage comparator 216 takes on the pulse waveform denoted by 804. Here the waveform of 804 is generated from the waveform of 802 by using a comparison voltage $V_{ref}$. When the output signal of the voltage comparator 216 has surpassed $V_{ref}$, which is the comparison voltage, the wake up signal 217 is transmitted by the wake up signal generator to the microcomputer 209 according to the part of the time chart denoted by 805. This wake up signal brings the microcomputer 209 into an awaken state.

Further, the output signal of the voltage comparator 216 is directly inputted into the microcomputer 209 as described above, and the microcomputer 209 counts the number of pulses to detect the intensity of the impact. The judgment by the microcomputer 209 that the output signal of the voltage comparator 216 has ended is based on the lapse of a period of time not less than a certain length ($t > t_o$) after the wave form 804 ceases to manifest any pulse as denoted by 806 of the time chart. The microcomputer 209, upon completing the detection of the intensity of the impact and other predetermined steps of processing, transmits a reset signal 220 and, after resetting the wake up signal generator 208, enters into a stand-by state. A time chart regarding the operating state of the microcomputer 209 is shown as denoted by 807.

The method for analog detection of the impact intensity charted in FIG. 8 is one example, and any other appropriate method can be used as well.

Figure 9:
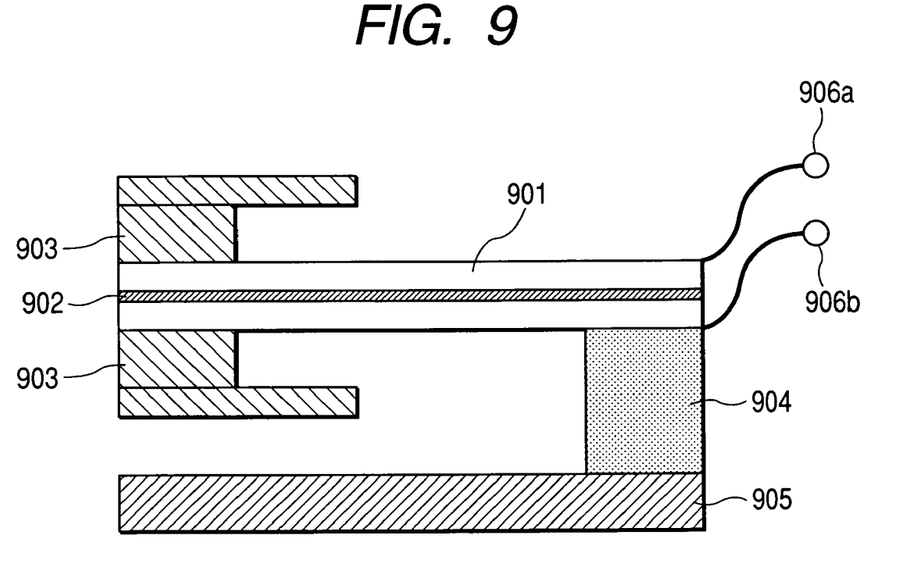
FIG. 9 shows another example of configuration of the sensor node for impact detection according to the invention.

FIG. 9 shows another example of configuration of the sensor node for impact detection according to the invention. The sensor node for impact detection of this example is configured of a piezoelectric element 901, a metal plate 902, a mass 903, a fixed plate 904, a fixed face 905 and electrodes 906a and 906b. The shape of the mass 903 differs from its counterpart in the configuration of the piezoelectric element unit shown in FIG. 3A.

Regarding the mass, it was stated with reference to the example shown in FIG. 3A that its size should be appropriate relative to the external vibration and the size of the piezoelectric element. However, depending on conditions, the mass 903 may be so large as to swell beyond the size of the piezoelectric element 901 at the other end than the fixed plate 904, or may extend in the direction of the fixed plate 904 and the fixed face 905, resulting in an increased size of the case to protect the piezoelectric element unit. In this embodiment, the protective case for the piezoelectric element unit can be made smaller by folding back the mass 903 toward the fixed plate 904.

Embodiment 3

Figure 10:
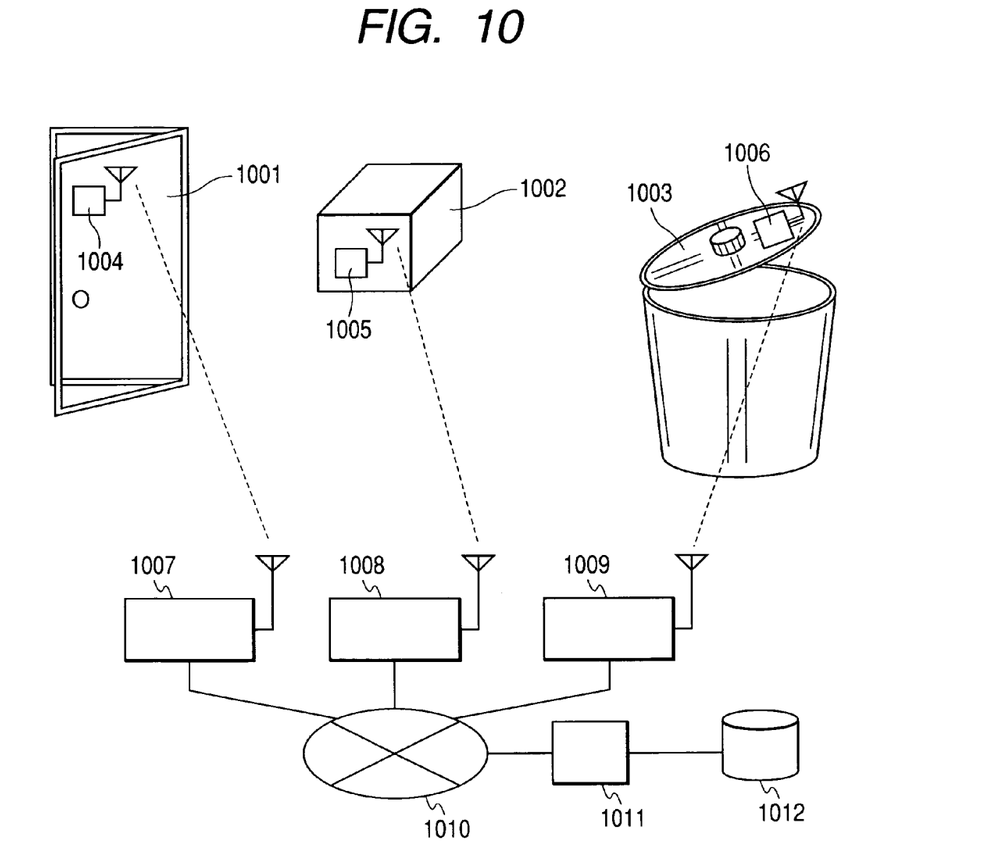
FIG. 10 shows one example of configuration of a sensor network system for impact detection using sensor nodes of the type shown in FIG. 1 or FIG. 2.

FIG. 10 shows one example of configuration of a sensor network system for impact detection using sensor nodes of the type shown in FIG. 1 or FIG. 2. This embodiment is configured of sensor nodes 1004 through 1006, base stations 1007 through 1009 for wireless reception of various items of information from the sensor nodes, a network 1010 to which the base stations are connected, a system control device 1011 for receiving information from the base stations via the network 1010 and processing the information into desired data, and a control information database 1012 for storing the data processed by the system control device 1011. In this embodiment, each of the sensor nodes 1004 through 1006 is installed on the object of intended detection, such as a door 1001, a cargo 1002 or a lid 1003. These objects of intended detection are mere examples, and many other items can be objects of detection.

Each of the sensor nodes 1004 through 1006, when detecting any external impact, actuates itself to perform predetermined control, and transmits the intensity of the impact, the time of detection of the impact, the value measured by the sensor and information to identify the sensor among other items of information.

Each of the base stations 1007 through 1009, when receiving from a sensor node information on the items referred to above, adds supplementary information including the time of receiving a wireless packet and information to identify the base station having received the wireless packet to the intensity of the impact, the time of measurement, the value measured by the sensor, information to identify the sensor and so forth, and transmits these items of information to the network 1010. These items of information are processed by the system control device 1011, and stored into the control information database 1112. The sensor nodes may either operate only when any impact is detected, or operate intermittently in normal times to sense various items of information and perform node operation, not intermittent, when there is any external impact.

Embodiment 4

Figure 11:
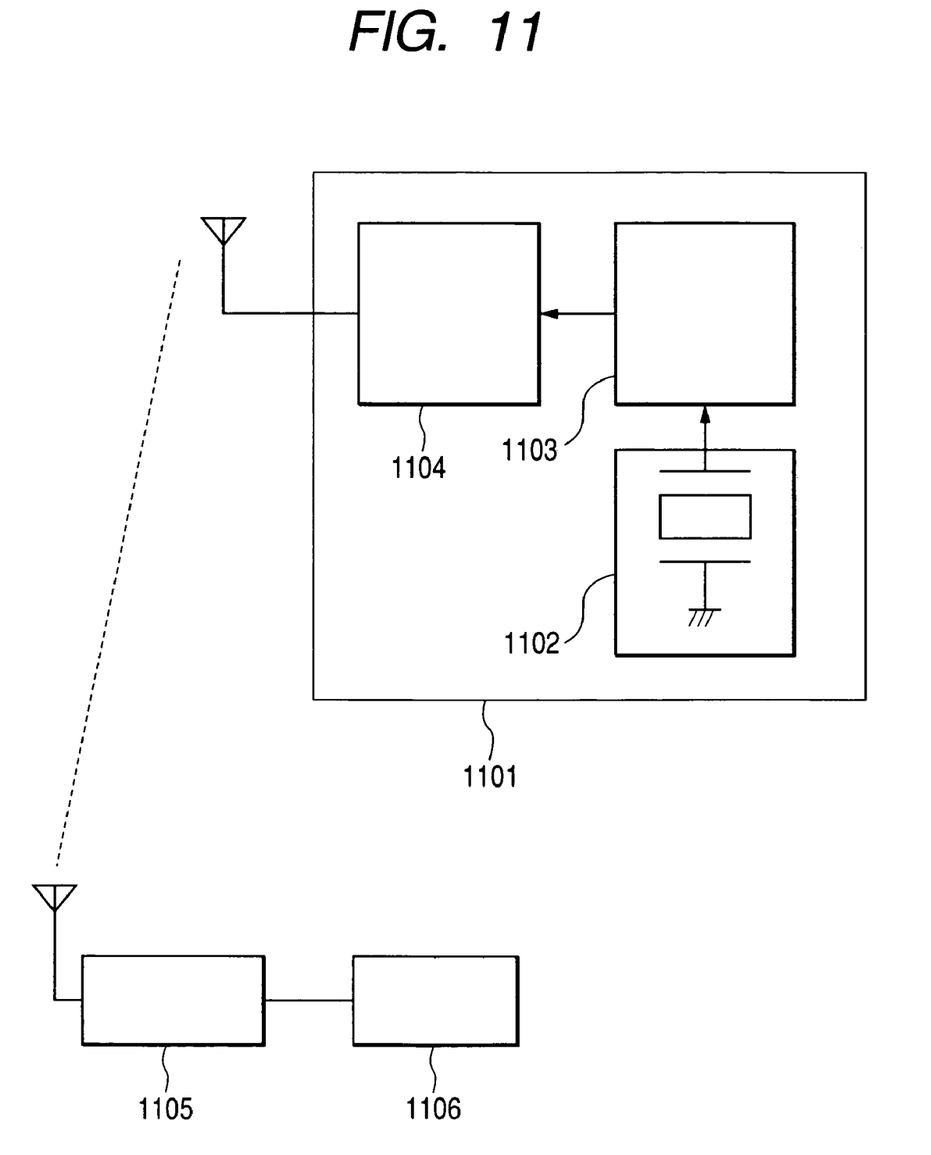
FIG. 11 shows one example of configuration of a power supply-free wireless communication node for impact detection using the sensor node shown in FIG. 1 or FIG. 2.

FIG. 11 shows one example of configuration of a power supply-free wireless communication node for impact detection using the sensor node shown in FIG. 1 or FIG. 2. This embodiment comprises a wireless communication node for impact detection 1101 configured of a piezoelectric element unit 1102, a capacitor 1103 and a radio frequency transceiver circuit 1104, a base station 1105 for wireless reception of various items of information from the wireless communication node for impact detection, and a display device 1106 for receiving the information from the base station and display its state. Since the radio frequency transceiver circuit operates only on the wattage generated by the piezoelectric element system 1102 in response to an external impact, here is realized a wireless communication node for impact detection requiring no power supply.

As hitherto described in detail, according to the present invention, it is made possible to save power consumption by measuring the intensity of an external impact in a multi-valued or analog mode according to the level of electric power generated by the distortion of a piezoelectric element by the impact and actuate a sensor node in a waiting mode by the generated power.

What is claimed is:

1. A sensor node for impact detection, comprising:
a shock detection sensor including a piezoelectric element unit which generates an electric charge corresponding to an external impact, a capacitor which rectifies and accumulates the electric charge so generated, and a voltage detector which operates on the accumulated power and externally outputs a signal when the accumulated voltage reaches a preset level;
a stand-by control object section which is caused by said external signal to return from a stand-by state and to operate; and
a power supply which feeds power to said stand-by control object section,
wherein the operation of said stand-by control object section is triggered by the signal of impact detected by said piezoelectric element unit, and
wherein said stand-by control object section measures an intensity of an impact by measuring a time length of a signal outputted by said shock detection sensor.

2. The sensor node for impact detection according to claim 1, wherein said shock detection sensor and said stand-by control object section are in a stand-by state until any impact is detected by said piezoelectric element unit.

3. The sensor node for impact detection according to claim 1, wherein said piezoelectric element unit is provided with a planar piezoelectric element member, a plate which fixes one end of said piezoelectric element member and a mass installed at an end of a free end, which is the other end of said piezoelectric element member, and an impulse working on said plate deforms said piezoelectric element member to generate an electric charge.

4. The sensor node for impact detection according to claim 1, wherein said stand-by control object section has means which, triggered by the signal of impact detected by said piezoelectric element unit, senses ambient information unevenly distributed in the environment, and processes the sensed information to perform wireless communication.

5. A sensor node for impact detection, comprising
a shock detection sensor including a piezoelectric element unit which generates an electric charge corresponding to an external impact, a capacitor which rectifies and accumulates the electric charge so generated, and a voltage comparator which compares the accumulated voltage with a reference voltage and externally outputs a signal when the accumulated voltage has surpassed the reference voltage; a stand-by control object section which is caused by said external signal to return from a stand-by state and to operate; and
a power supply which feeds power to said voltage comparator and said stand-by control object section, wherein the operation of said stand-by control object section is triggered by the signal of impact detected by said piezoelectric element unit,
wherein said stand-by control object section measures an intensity of an impact by measuring a time length of a signal outputted by said shock detection sensor.

6. The sensor node for impact detection according to claim 5, wherein said shock detection sensor and said stand-by control object section are in a stand-by state until any impact is detected by said piezoelectric element unit.

7. The sensor node for impact detection according to claim 5, wherein said piezoelectric element unit is provided with a planar piezoelectric element member, a plate which fixes one end of said piezoelectric element member and a mass installed at an end of a free end, which is the other end of said piezoelectric element member, and an impulse working on said plate deforms said piezoelectric element member to generate an electric charge.

8. The sensor node for impact detection according to claim 5, wherein said stand-by control object section has means which, triggered by the signal of impact detected by said piezoelectric element unit, senses ambient information unevenly distributed in the environment, and processes the sensed information to perform wireless communication.

9. A sensor node for impact detection, comprising:
a shock detection sensor including a piezoelectric element unit which generates an electric charge corresponding to an external impact, and a voltage comparator which compares the voltage so generated with a preset reference voltage and externally outputs a signal when the generated voltage has surpassed the reference voltage;

a stand-by control object section which is caused by said external signal to return from a stand-by state and to operate; and a power supply which feeds power to said voltage comparator and said stand-by control object section, wherein the operation of said stand-by control object section is triggered by the signal of impact detected by said piezoelectric element unit, and wherein said stand-by control object section measures an intensity of an impact by counting a number of times a signal is outputted by said shock detection sensor.

10. The sensor node for impact detection according to claim 9, wherein said shock detection sensor and said stand-by control object section are in a stand-by state until any impact is detected by said piezoelectric element unit.

11. The sensor node for impact detection according to claim 9, wherein said piezoelectric element unit is provided with a planar piezoelectric element member, a plate which fixes one end of said piezoelectric element member and a mass installed at an end of a free end, which is the other end of said piezoelectric element member, and an impulse working on said plate deforms said piezoelectric element member to generate an electric charge.

12. The sensor node for impact detection according to claim 9, wherein said stand-by control object section has means which, triggered by the signal of impact detected by said piezoelectric element unit, senses ambient information unevenly distributed in the environment, and processes the sensed information to perform wireless communication.

* * * * *